Figure 1:
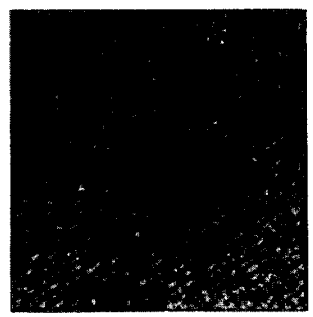

United States Patent [19]

Torigai et al.

[11] 4,362,647

[45] Dec. 7, 1982

[54] ELECTRODE AND THE METHOD FOR PRODUCING THE SAME

[75] Inventors: Eiichi Torigai, Yao; Noboru Wakabayashi, Ikeda; Yoji Kawami, Kawachinagano; Eiji Kamijo, Takatsuki; Tatsuya Nishimoto, Kawanishi; Katsuhito Tani, Toyonaka, all of Japan

[73] Assignees: Agency of Industrial Science & Technology, Tokyo; Sumitomo Electric Industries, Osaka, both of Japan

[21] Appl. No.: 267,854

[22] Filed: May 28, 1981

[30] Foreign Application Priority Data

Jun. 5, 1980 [JP] Japan ............................. 55-77038

[51] Int. Cl.³ .................. C25B 11/04; H01M 4/32; H01M 4/02
[52] U.S. Cl. ................. 252/425.3; 204/290 R; 429/223
[58] Field of Search ............. 252/425.3; 429/223; 204/290 R, 292

[56] References Cited

FOREIGN PATENT DOCUMENTS 45392 1/1966 German Democratic Rep. ................................ 429/223
669139 11/1929 France .............................. 429/223

Primary Examiner—F. Edmundson
Attorney, Agent, or Firm—Wenderoth, Lind & Ponack

[57] ABSTRACT

The invention relates to an aqueous electrolytic cathode and/or anode in which an aqueous solution of alkaline metal hydroxide is used or an active nickel or nickel alloy electrode having greater stability and smaller overvoltage under the condition of high current density for use in electrolysis of aqueous solution of alkaline metal halide, and the method for producing the same. Electrode material consisting of nickel or nickel alloy or electrode material of multiple layers comprising said electrode material coated with nickel or nickel alloy powder is forcibly subjected to oxidization and reduction treatments in repetition under a selected treatment temperature and atmosphere so that the surface area is expanded by the production of surface openings, thereby enabling to obtain an electrode having the said high properties.

5 Claims, 6 Drawing Figures

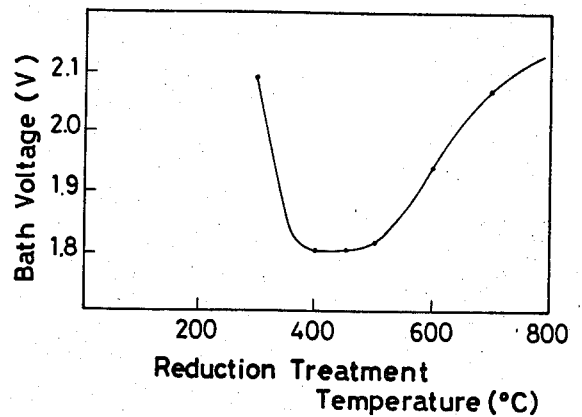
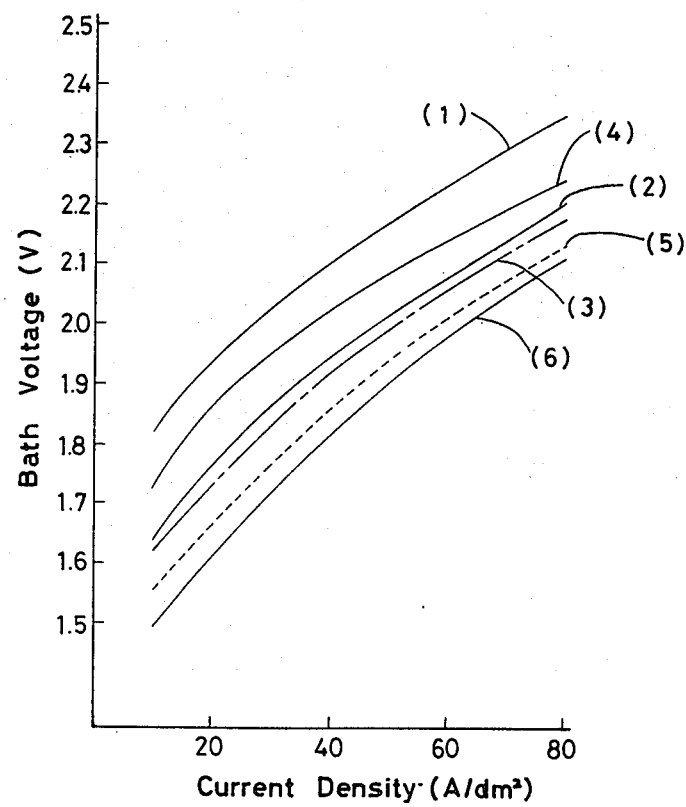

ELECTRODE AND THE METHOD FOR PRODUCING THE SAME

The invention relates to an aqueous electrolytic cathode and/or anode in which an aqueous solution of alkaline metal hydroxide is used, an electrode as a cathode and/or an anode for use in electrolysis of aqueous solution of alkaline metal halide, or an electrode for use in a battery, and a method for producing the same.

More particularly, the invention relates to an active nickel or nickel alloy electrode for use in electrolysis having greater stability and smaller overvoltage under the condition of high current density, and a method for producing the same.

The bath voltage for producing hydrogen and oxygen by electrolysis of aqueous solution of alkali comprises overvoltage of the cathode and anode and ohmic resistance of the bath solution, diaphragm, gas foam, etc. in addition to the thermodynamically computed theoretic decomposition voltage.

In order to increase the electrolytic energy efficiency, improvements have been made on the structural elements of said bath voltage, for example, an improvement on the electrode material for the reduction of the overvoltage and improvements on the diaphragm and the structure of the bath for the decrease of the ohmic loss.

In order to reduce the electrode overvoltage, endeavors have been made to find metals of high catalytic activity or oxides, sulfides, nitrides, etc. thereof, while activation treatment of nickel or nickel alloy electrode generally used in electrolysis of aqueous solution of alkali is attracting particular attention as an effective means. For example, in the case of the aqueous electrolytic bath of Allis Chalmers Mfg. Corp. in which a sintered nickel electrode is installed in close contact with the diaphragm, if an electrode having a large surface area with suitable through holes thereon is produced, the gas foam can be permitted to escape to the rearward of the electrode with simplicity and the bath voltage can be reduced by reducing the electrode overvoltage.

In recent years, development has been energetically forwarded relative to the treatment not only to impart a porous structure to the electrode itself but also to further expand the surface thereof. Among the treatment methods commonly known are the sintering method, spraying method, liquation method, etc.

The substrate metals in general use comprise iron, nickel or alloy thereof, titanium, etc. They are used in the state of screen, mesh, expanded sheet, or in a porous structure obtained by sintering, foaming, electroplating, etc.

In some cases, onto the substrate metal a powder body of nickel or nickel alloy is applied and sintered, or the electrode is coated by the flame or plasma spraying method. Alternatively, the electrode is covered by an alloy or the like, subsequently the soluble component being liquated thereby enabling a surface expansion layer to be formed.

The surface of the activated electrode thus obtained is in the state of irregular congregation of fine particles, the surface area being expanded several to several hundred times as large as that of the flat electrode. However, the particles are in a physically unstable state due to insufficient bonding between the particles.

In the active electrode obtained by the sintering method, the fine particles are in the state of superposed accumulation, hence the instability of bonding between the particles. If the sintering is promoted with the object of increasing the stability, the surface area will have to be sacrificed to a great extent. To be more precise, an electrode capable of satisfying physical stability and surface activity was not producible by the conventional method.

In practice, a comparison between a surface expansion electrode mounted as a cathode and/or an anode in the aqueous electrolytic bath and an untreated electrode shows a decline of bath voltage by $0.7 \sim 0.9$ V relative to a flat nickel electrode and a decline of $0.1 \sim 0.3$ V relative to a foam nickel electrode under the conditions of, for example, 40% KOH, 110° C. and 40 A/dm$^2$. Thus the effect of the surface expansion is quite obvious.

However, in case of electrolysis for a long period of time, the voltage of the bath in which the aforesaid surface expansion electrode is used has a steady upward tendency. The electrode detached from the bath after the electrolysis shows considerable exfoliation of the surface coating layer. It has been found that this phenomenon becomes more distinct according to the elevation of the temperature and current density.

The invention has been made as a result of improvements on the known active electrode having the afore-described defects. It provides a novel method for the surface expansion treatment and a stable and active electrode.

The inventors concerned have found that surface expansion treatment can be accomplished by producing openings on the surface of a nickel or nickel alloy electrode through forcible repetition of oxidization and reduction under a selected treatment temperature and atmosphere.

In effect, the activation treatment according to the invention is characterized by the combination of the operation of submitting a nickel or nickel alloy electrode to oxidization treatment at a temperature below the melting point thereof so that an oxide is produced and the subsequent operation of reduction in a reducing atmosphere below 600° C.

Generally, one cycle is sufficient for the oxidization and reduction. However, when the substrate electrode has a smooth surface, the degree of activation can be increased by repetition of several cycles.

The following is brief description of the accompanying drawings.

Figure 3:
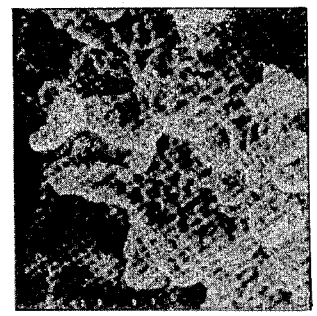
Figure 2:
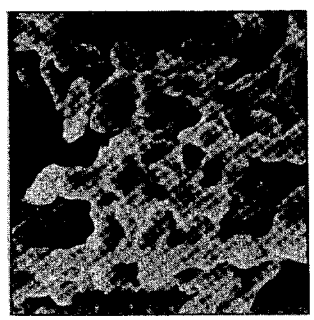
Figure 4:
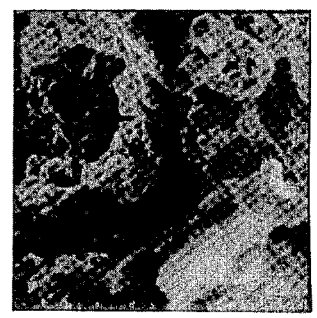

FIG. 1 is a microphotograph showing the surface structure of a flat nickel electrode subjected to one cycle of the activation treatment according to the invention. The microphotograph shows uniform openings formed on the surface of the electrode. FIG. 2 is a microphotograph showing the surface structure of a duplex nickel electrode comprising foam nickel rigidly coated with carbonyl decomposition nickel powder by sufficient sintering. FIG. 3 is a microphotograph showing the surface structure of the sintered nickel electrode subjected to oxidization treatment by the method according to the invention. FIG. 4 is a microphotograph showing the surface structure of the electrode subsequently subjected to reduction treatment. FIG. 5 is a diagram showing the interrelation between the reduction treatment temperature and the bath voltages of the electrode according to the invention. FIG. 6 is a diagram showing the interrelations between the current densities and the bath voltages of the electrode according to the invention and the conventional electrode.

The invention will now be described in more detail in reference to the accompanying drawings.

As is apparent from said microphotographs, the surface structure of the electrode obtainable by the method according to the invention is of the contracted pore type or spongy type. Such surface structure substantially has a surface expansion effect while being completely free from the danger of exfoliation during the operation for a long period of time unlike the case of the skeleton type or superposed accumulation type obtained by the conventional method.

The treatment method according to the invention has higher utility over the conventional activation treatment method in respect of its applicability without regard to the configuration of the substrate electrode. In fact, the electrode according to the invention can be embodied in a large variety of configurations.

A porous electrode is frequently utilized in order to produce a more active electrode. An active electrode of very high quality can be produced if powder of nickel, nickel-cobalt alloy or nickel-molybdenum alloy is sintered or sprayed onto the surface of the electrode thereby enabling to obtain a stabilized surface expansion structural layer as shown in FIG. 2, subsequently said electrode being activated by the treatment method according to the invention.

The oxidization treatment of the electrode material is usually effected in the air or atmosphere of excess oxygenation at a temperature above 800° C. and below the melting point of said electrode material for 0.5-3 hours. It is needless to mention that the electrode obtained by the oxidization treatment can be used as an anode and/or a cathode as it stands.

The reduction treatment is usually effected in a hydrogen atmosphere at a temperature of 300°-600° C., and preferably 400°-500° C., for 1-3 hours.

The performance assessment of the electrode thus obtained was effected by use of the following electrolytic apparatus.

A cell was assembled by making use of a pair of flanges (150 mm$\phi$ × 15 mm t) maee of nickel with the test electrodes (cathode and anode) and the diaphragm placed between AFLUS (fluoric rubber made by Asahi Glass Mfg. Co.) packings. The electrolysis aqueous solution was adapted to be discharged from the upper part of the cell after flowing between the electrodes or between the electrodes and the diaphragm from the lower part of the cell. The diaphragm was made of a film of compound material (effective resistance 0.28$\Omega$cm$^2$, 25° C.) comprising porous polytetrafluorethylene plugged with potassium titanate. A nickel container having a capacity of 2 l which was both a gas-liquid separator and a bath liquid tank was provided with a heater enabling to control the temperature from room level to 110° C. The electrolyte was 40% KOH aqueous solution which was circulated through the electrolytic bath in the ratio of 0.5-1 l/min. After conditioning drive for about 5 hours with electric pressure applied to the nickel terminal plates, the interrelation between current density and bath voltage at a predetermined temperature was examined.

In the foregoing description of the invention, the reduction treatment has been described in relation to heat treatment in a reducing atmosphere only. Needless to mention, however, high performance is also obtainable, for example, by electrolytic reduction.

The invention will be described in more detail in reference to the following examples.

EXAMPLE 1

Porous nickel plates 1 mm in thickness and 2 mm in pore diameter were subjected to heat oxidization treatment at a temperature of 900°-1000° C. for 1 hour in the air, subsequently said nickel plates being subjected to reduction treatment in a hydrogen atmosphere for 2 hours at a temperature of 350° C., 400° C., 500° C., 600° C. and 800° C. respectively, to obtain electrodes according to the invention.

An electrolytic test was made by using such electrodes as cathodes and anodes in order to find the interrelations between the reduction treatment temperatures and the electrode activities, respectively. As a result, the curves as shown in FIG. 5 were obtained.

FIG. 5 shows that, when the reduction treatment temperature is below 350° C., the effect of activation is insufficient due to slow reduction of the nickel oxide, while if above 600° C., the surface expansion effect is lost due to progress of sintering of the surface of the nickel oxide. In fine, it has been found that the optimum treatment temperature is within the range of 350°-600° C.

Among the aforesaid electrodes, the one obtained by reduction treatment in hydrogen atmosphere at 400° C. for 2 hours was examined to find the variation of current density and bath voltage under the conditions of 110° C., 40% KOH and 1 l/min. The result was the curve (2) in FIG. 6. It was found that the bath voltage was reduced by 0.16 V at 50 A/dm$^2$ compared with the curve (1) of the untreated nickel electrode prepared by way of comparison.

EXAMPLE 2

A nickel alloy porous plate (1 mm in thickness and 2 mm in pore diameter) containing 20 weight % cobalt was subjected to oxidization treatment and reduction treatment under the same conditions as in Example 1 to obtain an electrode according to the invention.

The interrelation between current density and bath voltage was examined on said electrode under the same conditions as in Example 1 to obtain the curve (3) of FIG. 6. The reduction of bath voltage at 50 A/dm$^2$ was 0.19 V below that of untreated nickel.

EXAMPLE 3

Foam nickel having a mean pore diameter of 1-2 mm, porosity of 95% and thickness of 5 mm was subjected to heat oxidization treatment at a temperature of 900° C. for 2 hours in the air, subsequently said foam nickel being subjected to reduction treatment at 450° C. for 2 hours in a hydrogen atmosphere, to obtain an electrode according to the invention.

An electrolytic test was conducted on said treated electrode and an untreated foam nickel electrode respectively to obtain the curve (5) for the former and the curve (4) for the latter.

EXAMPLE 4

An electrode substrate consisting of the foam nickel used in Example 3 was coated with carbonyl nickel (mean diameter 2$\mu$) and then sintered at 1000° C. Subsequently, the coated electrode was subjected to oxidization treatment at 900° C. for 1 hour in the air and then to reduction treatment at 400° C. for 2 hours in a hydrogen atmosphere, to obtain a treated electrode. The result of the electrolytic test of said electrode is shown by the curve (6) in FIG. 6.

Needless to mention, the results of the electrolytic tests of the 4 examples shown in FIG. 6 designate the correlations between the electrode surface area values and activities, respectively.

To be more precise, it has been found that the foam type electrode has higher activity than the flat type electrode, while the electrode subjected to activation treatment according to the invention has still higher activity.

What is claimed is:

1. A method for producing an electrode characterized in that electrode material consisting of nickel or nickel alloy or electrode material of multiple layers comprising said electrode material coated with nickel or nickel alloy powder is subjected to oxidization treatment in a high temperature oxidizing atmosphere, said electrode material being then subjected to reduction treatment in a reducing atmosphere at a temperature lower than said oxidization temperature.

2. A method for producing an electrode as defined in claim 1 characterized in that the electrode material is a porous plate.

3. A method for producing an electrode as defined in claim 1 characterized in that the electrode material is of a porous structure.

4. A method for producing an electrode as defined in claim 1 characterized in that the temperature of the oxidization treatment is higher than 800° C. and lower than the melting temperature of the electrode material.

5. A method for producing an electrode as defined in claim 1 characterized in that the temperature of the reduction treatment is 300°~600° C.

* * * * *